United States Patent [19]

Kern

[11] Patent Number: 5,821,635
[45] Date of Patent: Oct. 13, 1998

[54] METHOD FOR CONTROLLING THE POWER SUPPLIED BY AN ELECTRICAL CIRCUIT, IN PARTICULAR, A SINUSOIDAL SOURCE

[75] Inventor: Robert Kern, Sasbachwalden, Germany

[73] Assignee: Robert Bosch GmbH, Stuttgart, Germany

[21] Appl. No.: 817,981

[22] PCT Filed: Jul. 12, 1996

[86] PCT No.: PCT/DE96/01261

§ 371 Date: Apr. 25, 1997

§ 102(e) Date: Apr. 25, 1997

[87] PCT Pub. No.: WO97/08601

PCT Pub. Date: Mar. 6, 1997

[30] Foreign Application Priority Data

Aug. 26, 1995 [DE] Germany .................. 195 31 517.0

[51] Int. Cl.⁶ .......................................... G05F 1/00
[52] U.S. Cl. .................... 307/31; 327/175; 327/451; 318/809
[58] Field of Search ................ 307/31, 41; 327/451, 327/175; 315/DIG. 4, 308; 318/809

[56] References Cited

U.S. PATENT DOCUMENTS

| | | | |
|---|---|---|---|
| 3,633,094 | 1/1972 | Clements | 327/451 |
| 3,927,349 | 12/1975 | Suhren et al. | 327/451 |
| 4,010,412 | 3/1977 | Forman | 307/41 |
| 4,358,716 | 11/1982 | Cordes et al. | 327/175 |
| 4,358,730 | 11/1982 | Beifus | 318/809 |

*Primary Examiner*—Jeffrey A. Gaffin
*Assistant Examiner*—Albert W. Paladini
*Attorney, Agent, or Firm*—Spencer & Frank

[57] ABSTRACT

A method for controlling the power supplied by a sinusoidal source (1) wherein the power supplied is determined, on the one hand, by the integer number of the pulses comprised in a burst which is fully switched through to the load (17) at the output of the circuit and, on the other hand, by the length of the last phase angle-controlled pulse within each burst. To provide the actuation signal for a switch which connects the sinusoidal pulses to the load, the zero passages of the sinusoidal pulses (A) of the sinusoidal source (1) are determined in a zero passage detector (5). A division circuit (7) generates trigger pulses (C) of a lower frequency from the zero passage pulses (B), which trigger pulses reset the ramp voltage (D) of a sawtooth generator (9). The ramp voltage (D) is compared in a comparator (15) to a regulated quantity (E) of a desired value device (11). The comparator then emits the actuation signal (F) to a power switch (4) for controlling the connection of the burst of pulses to the load when the ramp voltage (D) exceeds the regulated quantity (E).

6 Claims, 2 Drawing Sheets

METHOD FOR CONTROLLING THE POWER SUPPLIED BY AN ELECTRICAL CIRCUIT, IN PARTICULAR, A SINUSOIDAL SOURCE

PRIOR ART

The invention is based on a method for controlling the power supplied by an electrical circuit, in particular, a sinusoidal source of the generic type which generates a controllable output power from a DC voltage supply, with the current flowing essentially sinusoidally.

It is generally known to operate a high-frequency-operated sine power converter, in particular, in the form of a sinusoidal source, according to so-called phase-angle control, which power converter supplies a controllable power from a DC voltage supply. Disadvantageous in this control are the associated switch-off losses because, during switch-off in the reduced power mode, switching does not take place in the current zero and because this switch-off process takes place within each half period.

Furthermore, it is known to implement a power control according to the so-called pulse package control or burst control. This implies that a package switched through at a specific switching frequency respectively comprises several sinusoidal pulses of a higher frequency. Since the current is only switched off when the current goes through zero to avoid switch-off losses, the disadvantage of this control is that a precise power control cannot be accomplished with this method because, after all, the output power is only possible in jumps of one pulse each time, i. e., the power can only be quantized in rough steps. This applies at least in those instances where the burst repetition frequency must not be allowed to become too low.

SUMMARY AND ADVANTAGES OF THE INVENTION

In contrast, the method according to the invention for controlling the power supplied by an electrical circuit, in particular, a sinusoidal source, having the characteristics according to the present invention offers the advantage of a finely quantizable power control in the entire adjustment range with a minimum switch-off power loss since it occurs only once within the burst repetition frequency.

In principle, this is accomplished according to the invention in that the supplied power is determined, on the one hand, by the integer number of the sinusoidal pulses comprised in a burst which is fully switched through to the output of the circuit and, on the other hand, by the length of the last phase angle-controlled pulse within each burst which is switched through to the output of the circuit, with the frequency of the pulse sequence within the bursts being selected to be constant and considerably higher than the burst repetition frequency. In other words, a burst is first fully switched through in the invention for a period of time and then the last half period or complete period of a pulse within the burst with phase angle-controlled and switched through phase is controlled.

Advantageous modifications and improvements of the method according to the invention discussed above are possible by way of the measures disclosed and discussed an advantageous circuit arrangement for gaining the actuation signal according to the invention is likewise disclosed.

According to a particularly advantageous feature of the invention, the bursts are switched through in such a manner that the switching elements switching the current are switched in the zero passage of the sinusoidal pulses to avoid switch-off losses, with the exception of the period portion that is phase angle-controlled.

An advantageous embodiment of the invention provides that the actuation signals for the switching elements switching the current are produced in a similar manner as in the phase-angle control, with a pulse width gain being carried out by comparator comparison of the regulated quantity with a sawtooth voltage and a sawtooth generator being operated with an n-fold lower frequency than the frequency of the sinusoidal pulses in the bursts. In an advisable modification of the invention, the n-fold lower frequency of the sawtooth generator corresponds to the pulse frequency divided by 8 up to 256.

In a further configuration of the invention, the present method according to the invention can be used in a particularly advantageous and useful manner for the precise and very low-loss control of the lamp power of a high-pressure gas discharge lamp in a motor vehicle. There, in particular, it is essential for saving the battery that power losses be avoided and user power be controlled precisely.

A particularly advantageous arrangement for gaining the actuation signal for the switching of the power switches, which switch the pulses of the sinusoidal source through to the load according to the method of the invention, provides that a zero passage detector is provided which detects the zero passages of the sinusoidal pulses of a sinusoidal source, that a division circuit is provided which generates trigger pulses of a lower frequency from the determined zero passage pulses, which lower frequency trigger pulse reset the ramp voltage of an available ramp generator or sawtooth generator, that the ramp voltage is compared in an available comparator to a regulated quantity of a desired value device and then emits the actuation signal if the ramp voltage exceeds the regulated quantity.

BRIEF DESCRIPTION OF THE DRAWINGS

The invention is explained in greater detail in the description that follows by way of an embodiment illustrated in the drawing wherein.

DETAILED DESCRIPTION OF THE EMBODIMENT

The method according to the invention provides that the supplied power is determined, on the one hand, by the integer number of the pulses comprised in a burst which is fully switched through to the output of the circuit and, on the other hand, by the length of the last phase angle-controlled pulse within each burst, with the frequency of the pulse sequence within the bursts selected to be constant and considerably higher than the burst repetition frequency. This is illustrated particularly by way of the representation in FIG. 2, diagram G, namely shown there by way of the fully switched through pulse half waves 1 to 13 and the phase angle-controlled pulse half wave 14, illustrated by way of the bold line.

Figure 1:
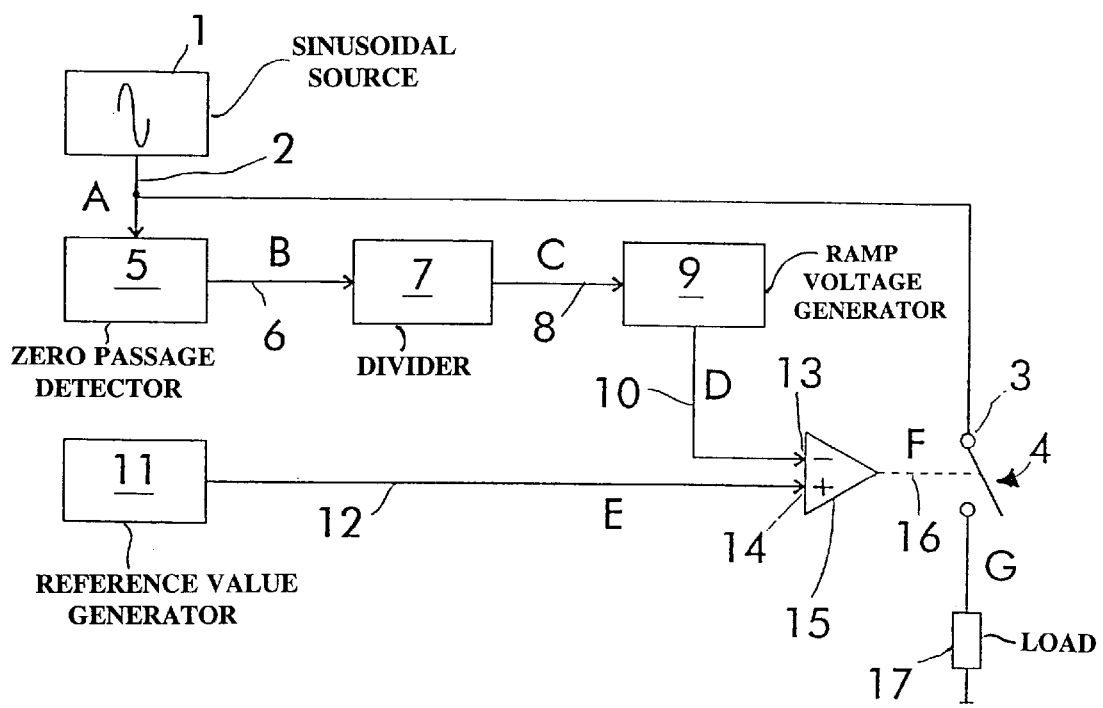
FIG. 1 is a schematic block diagram of a circuit designed according to the invention in which the method according to the invention is applied, and, FIG. 2 shows schematically, the pulse and current curve in the method according to the invention at different points of the circuit according to FIG. 1.
Figure 2:
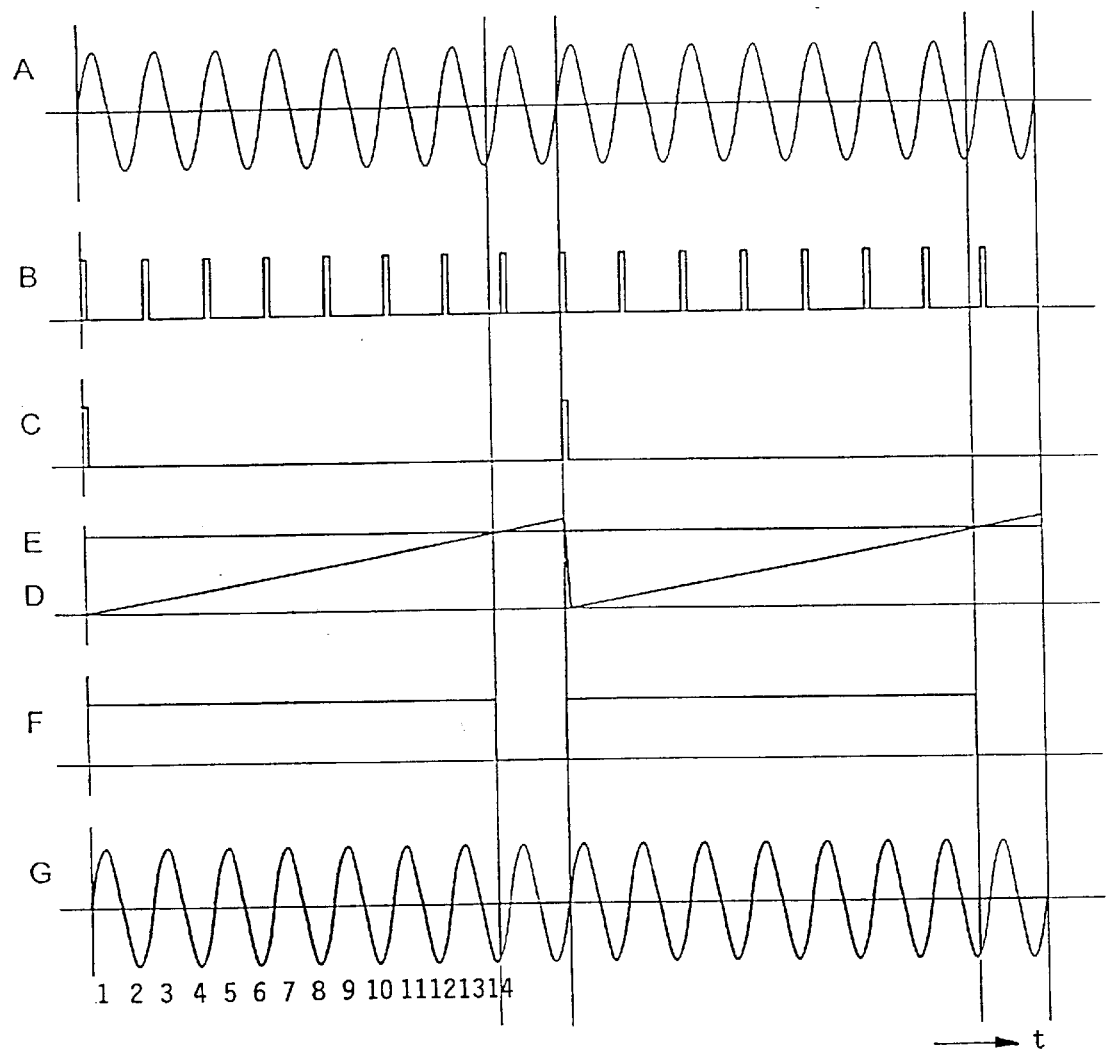

In the method according to the invention, the switching through of the bursts is accomplished such that the switching elements switching the current, for example, the controlled switch 4 in FIG. 1, are switched at the zero passage of the sinusoidal pulses A to avoid switch-off losses, with the exception of the period portion 14 of FIG. 2 that is phase angle-controlled.

The actuation signals for the switching elements 4 switching the current are produced or derived in a similar manner as for the phase-angle control, with a pulse width gain being accomplished by comparator comparison of a regulated quantity E with a sawtooth voltage D and a sawtooth generator 9 being operated with an n-fold lower frequency than the frequency of the sinusoidal pulses A in the bursts. The n-fold lower frequency of signal D of the sawtooth generator 9 advantageously corresponds to a pulse frequency of signal A of the sinusoidal source 1 in FIG. 1 divided by 8 up to 256.

In addition to a particularly advisable circuit design for the implementation of the method according to the invention, the mode of operation of this method for the power control of an electrical circuit is also explained in greater detail by way of the circuit arrangement or the diagrams illustrated in FIGS. 1 and 2.

By way of a block diagram, FIG. 1 schematically illustrates a circuit designed according to the invention in which the method according to the invention is applied. In FIG. 1, letters A to G identify the points at which a specific pulse and current curve is present, which curve is illustrated with the corresponding letters in FIG. 2 over the time axis t in the form of a diagram.

According to FIG. 1, the circuit according to the invention comprises a sine-wave generator or a sinusoidal source 1 whose power supplied to a load 17 is intended to be controlled. Output 2 of the sinusoidal source 1 is fed, on the one hand, to a contact 3 of a schematically illustrated controlled switch 4 and, on the other hand, to a zero passage detector 5. This zero passage detector 5 detects the zero passages of the sinusoidal voltage or of the sinusoidal current present at output 2 of the sinusoidal source 1 and whose curve is illustrated by A of FIG. 2. Accordingly, a pulse is generated during each zero passage of current A, which pulse is represented in diagram B of FIG. 2 and which is present at output 6 of the zero passage detector 5. These pulses B are supplied to a division circuit 7 which carries out a division by n. The value of n can be selected as a function of circumstances and requirements and it defines how often a pulse appears at output 8. The curve of the pulses at output 8 is illustrated in diagram C of FIG. 2. In the illustrated embodiment, the value of n=8. Thus, only every eighth pulse of diagram B appears at output 8 of the division circuit 7. The pulses C are fed to a sawtooth generator or ramp generator 9 and respectively trigger, that is, start the same. The ramp generator 9 generates a ramp-shaped voltage D at its output 10, which voltage curve is illustrated in diagram D of FIG. 2. The ramp-shaped voltage D is reset to zero when a pulse C appears and begins to build up and run up once again.

At its output 12, a desired value device 11 supplies a regulated quantity E to which the power of the sinusoidal source 1 is to be controlled. The signal D at output 10 of the ramp generator 9 is supplied to a negative input 13 and the regulated quantity E at output 12 of the desired value device 11 to the positive input 14 of a comparator 15. If the value of the ramp voltage D exceeds the value of the regulated quantity E, then the control signal F is generated at output 16 of the comparator 15, with which control signal the power switch 4 is controlled. This signal F is a pulse whose width changes as a function of the regulated quantity E.

Accordingly, at the load 17, a current curve appears which is illustrated in diagram G. As is indicated in FIG. 2 by bolder lines, 13 complete sinusoidal half waves are switched through in burst and additionally a portion of the 14th half wave in the manner of phase-angle control, in the embodiment shown slightly more than half of the 14th half wave is switched through to the load. The remainder of the 14th half wave as well as half waves 15 and 16 are not switched through to the load 17. This is illustrated by the thin lines in diagram G of FIG. 2. The burst control itself is not indicated here since it is not the subject matter of the present invention. It is higher ranking. It controls the power switch 4 in such a manner that the half waves 1 to 13 are fully controlled through to the load 17 in each case. Overall, the path of the load current or the power at the load 17 has the curve illustrated in bold lines in diagram G of FIG. 2.

The method according to the invention and the illustrated advantageous circuit for its implementation can be used particularly advantageously for the precise and very low-loss control of the lamp power of a high-pressure gas discharge lamp in a motor vehicle. There, in particular, it is essential for saving the battery that power losses be avoided and user power be controlled precisely.

This is where the present invention makes a particularly useful contribution. Very generally, the invention proposes an option for adjusting the output power of a sinusoidal source operated at high frequency in such a way that, in this process, the power loss is as small as possible and a fine quantization of the output power becomes possible.

I claim:

1. A method for controlling the power supplied by an electrical circuit, in particular, a sinusoidal source, which generates a controllable output power from a DC voltage supply, with the current flowing essentially sinusoidally, comprising the steps of: providing bursts, at a burst repetition frequency, of a sequence of sinusoidal pulses, with the frequency of the pulse sequence within the respective bursts being constant and considerably higher than the burst repetition frequency; and controlling the portion of each burst which is switched through to an output of the circuit, for supply to a load, such that the power supplied is determined by an integer number of the pulses comprised in a burst which is fully switched through to the output of the circuit and by the length of a following phase angle-controlled last pulse within each burst which is switched through to the output of the circuit.

2. A method according to claim 1, wherein the switching through of the bursts takes place such that switching elements switching the current are switched at the zero passage of the sinusoidal pulses to avoid switch-off losses, with the exception of the period portion of the last pulse that is phase angle-controlled.

3. A method according to claim 1, wherein actuation signals for the switching elements switching the current are derived by comparison of a regulated quantity with a sawtooth voltage generated by a sawtooth generator operated with an n-fold lower frequency, corresponding to the burst repetition frequency, than the frequency of the sinusoidal pulses in the bursts.

4. A method according to claim 3, wherein the n-fold lower frequency of the sawtooth generator corresponds to the sinusoidal pulse frequency divided by 8 up to 256.

5. An arrangement for deriving the actuation signal for implementing a method according to claim 3, comprising: a zero passage of detector [(5) is provided] which detects the zero passages of the sinusoidal pulses [(A)] of a sinusoidal source to provide zero passage pulses; [(1), that ] a division circuit [(7) is provided]which generates trigger pulses [(C)] of a lower frequency from the provided zero passage pulses; a ramp generator or sawtooth generator whose ramp voltage is reset by the trigger pulses; and a comparator which compares the ramp voltage with a regulated quantity [(E)] of a desired value device [(11)] and then emits the actuation signal [(F)] when the ramp voltage [(D)] exceeds the regulated quantity [(E)].

6. A method according to claim 1, used for the control of the lamp power of a high-pressure gas discharge lamp in a motor vehicle.

* * * * *